United States Patent
Chen et al.

(10) Patent No.: US 9,378,702 B2
(45) Date of Patent: Jun. 28, 2016

(54) ELECTRONIC DEVICE USING METHOD, ELECTRONIC DEVICE AND ELECTRONIC APPARATUS ADAPTED TO SWITCH OPERATING MODES

(71) Applicant: Wistron Corporation, New Taipei (TW)

(72) Inventors: Shiuan-De Chen, New Taipei (TW);
Tsung-Hsien Tsai, New Taipei (TW);
Chun-Peng Hsu, New Taipei (TW);
Hung-Li Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/509,057

(22) Filed: Oct. 8, 2014

(65) Prior Publication Data
US 2015/0348497 A1   Dec. 3, 2015

(30) Foreign Application Priority Data
May 30, 2014 (TW) .............................. 103119034 A (51) Int. Cl.
| | | |
|---|---|---|
| G09G 5/00 | (2006.01) | |
| G01C 9/06 | (2006.01) | |
| G06F 3/14 | (2006.01) | |
| G06F 1/16 | (2006.01) | |

(52) U.S. Cl.
CPC ........ G09G 5/005 (2013.01); G01C 9/06 (2013.01); G06F 1/1601 (2013.01); G06F 3/1423 (2013.01); G09G 2340/14 (2013.01); G09G 2340/145 (2013.01); G09G 2356/00 (2013.01)

(58) Field of Classification Search
CPC ... G09G 5/005; G09G 2340/145; G09G 5/00; G01C 9/06
USPC .............. 257/722; 345/1.1, 30, 1.2, 1.3, 650, 345/657, 659
See application file for complete search history.

(56) References Cited

U.S. PATENT DOCUMENTS

| | | | | |
|---|---|---|---|---|
| 8,860,765 | B2* | 10/2014 | Kilpatrick, II | ........ G06F 1/1616 345/1.1 |
| 2010/0060664 | A1 | 3/2010 | Kilpatrick, II et al. | |
| 2013/0150120 | A1* | 6/2013 | Wu | ........ G06F 1/1626 455/556.1 |
| 2013/0215008 | A1 | 8/2013 | Hung | |
| 2014/0064549 | A1* | 3/2014 | Liang | ........ H04R 1/323 381/387 |
| 2014/0111449 | A1 | 4/2014 | Lee | |

FOREIGN PATENT DOCUMENTS

| | | |
|---|---|---|
| CN | 102415744 | 4/2012 |
| TW | 200939012 | 9/2009 |
| TW | I386793 | 2/2013 |
| TW | 201335791 | 9/2013 |
| TW | 201349088 | 12/2013 |
| TW | 201352002 | 12/2013 |
| TW | 201411353 | 3/2014 |
| TW | I428907 | 3/2014 |

OTHER PUBLICATIONS

"Office Action of Taiwan Counterpart Application," issued on Oct. 22, 2015, with English translation thereof, p. 1-p. 5, in which the listed references were cited.

* cited by examiner

*Primary Examiner* — Alexander Oscar Williams
(74) *Attorney, Agent, or Firm* — Jianq Chyun IP Office (57) ABSTRACT

An electronic device using method is provided. First, an electronic device and a display device are provided. Then, detecting whether the electronic device is electrically connected to the display device. If the electronic device is electrically connected to the display device, then a tilting angle of the electronic device is sensed. An operating mode of the electronic device corresponding to the display device is determined according to the tilting angle of the electronic device. In addition, an electronic device and an electronic apparatus having the electronic device is also provided.

11 Claims, 12 Drawing Sheets

ELECTRONIC DEVICE USING METHOD, ELECTRONIC DEVICE AND ELECTRONIC APPARATUS ADAPTED TO SWITCH OPERATING MODES

CROSS-REFERENCE TO RELATED APPLICATION

This application claims the priority benefit of Taiwan application serial no. 103119034, filed on May 30, 2014. The entirety of the above-mentioned patent application is hereby incorporated by reference herein and made a part of this specification.

BACKGROUND OF THE DISCLOSURE

1. Field of the Disclosure

The disclosure relates to an electronic device using method, and more particularly to an electronic device using method and an electronic apparatus having the electronic device.

2. Description of Related Art

With the continuous progression of the technology, various kinds of portable electronic devices have been developed, such as notebook computers, smart phones, tablet PC, and so on. Users are able to process, receive and send data at anytime and anywhere with the portable electronic devices which has become indispensable elements for human life.

Taking a tablet computer as an example, the tablet computer has advantages of being light in volume and portable, thus it is very convenient to use when users are outside. In addition, when users are home or at work, the screen of the personal computer may be externally connected to the tablet computer, so as to use the larger external connected screen to display the operating image of the tablet computer, and perform various operations such as word processing, holding video conferences, or the like. Under the above mentioned using method of the tablet computer and the external connected screen, how to switch the various operating modes of the tablet computer and the external connected screen by using a simple process has become an important issue of the tablet computer designs.

SUMMARY OF THE DISCLOSURE

The disclosure provides an electronic device using method, an electronic device and an electronic apparatus, adapted to simply switch the various operating modes of the electronic device corresponding to the display device.

The electronic device using method includes the following steps. First of all, an electronic device and a display device are provided. Next, whether the electronic device is electrically connected to the display device is detected. If the electronic device is electrically connected to the display device, then the tilting angle of the electronic device is sensed. The operating mode of the electronic device corresponding to the display device is determined according to the tilting angle of the electronic device.

The electronic apparatus in the disclosure includes a display device, a carrier structure, an electronic device and a sensing unit. The carrier structure is electrically connected to the display device. The electronic device is carried on the carrier structure and electrically connected to the display device through the carrier structure, wherein the tilting angle of the electronic device changes with the actuation of the carrier structure. The sensing unit is disposed at one of the carrier structure and the electronic device and adapted for sensing the tilting angle of the electronic device.

An electronic device is selectively electrically connected to a display device. The electronic device includes a connection detecting unit, a sensing unit and a control unit. The connection detecting unit is adapted for detecting whether the electronic device is electrically connected to the display device. The sensing unit is adapted for sensing the tilting angle of the electronic device. The control unit is electrically connected to the connection detecting unit and the sensing unit. When the electronic device is electrically connected to the display device, the control unit is adapted for determining an operating mode of the electronic device corresponding to the display device, according to the tilting angle of the electronic device.

In light of the above, in the electronic device using method of the disclosure, when the electronic device is electrically connected to the display device so that the electronic device and the display device may simultaneously perform displaying images, the operating mode of the electronic device corresponding to the display device is switched according to the tilting angle of the electronic device. Accordingly, users may only need to adjust the electronic device to have a tilting angle which is corresponding to a specific operating mode, then the electronic device may be automatically switched to be in the specific operating mode corresponding to the display device as expected by the user, so as to simplifying the operating process of the electronic device and the display device, such that the user may be provided a smoother and more intuitional operating experience.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
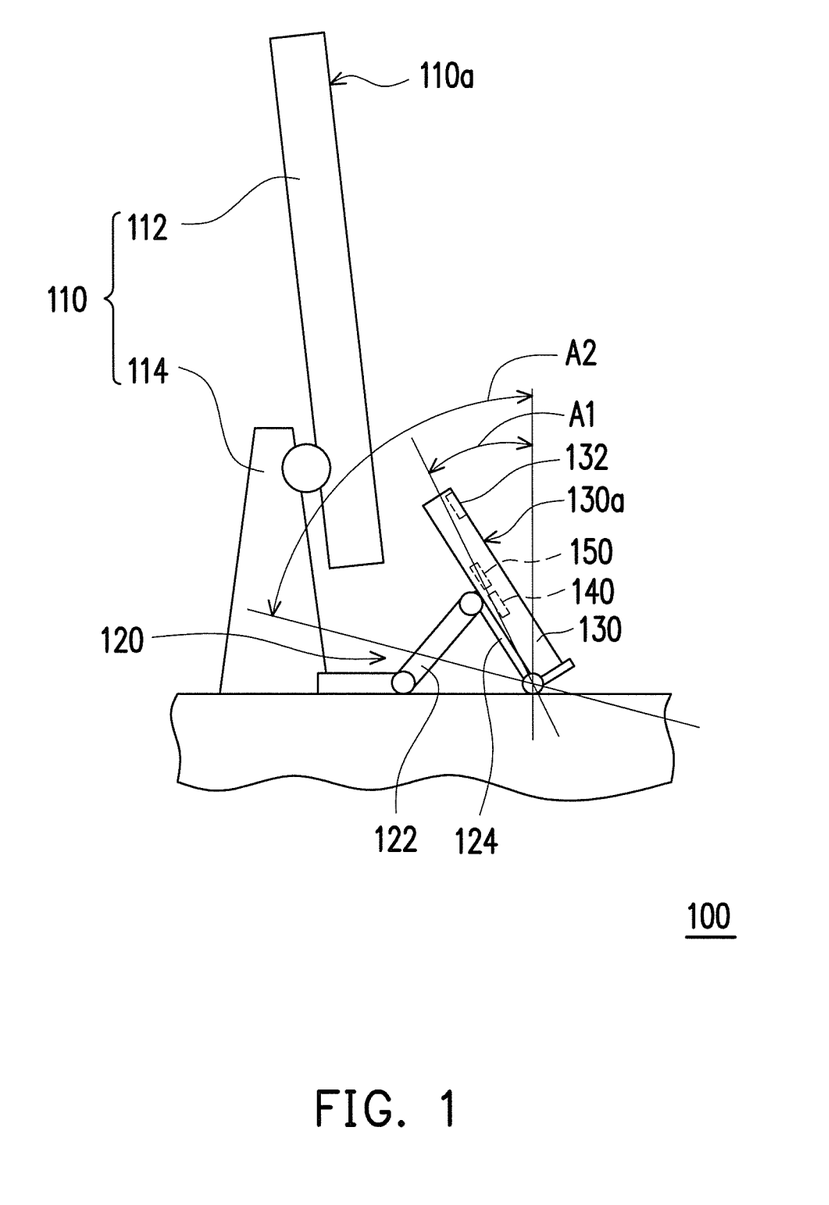
FIG. 1 is a schematic view of an electronic apparatus according to an exemplary embodiment of the disclosure.

FIG. 1 is a schematic view of an electronic apparatus according to an exemplary embodiment of the disclosure. Referring to FIG. 1, the electronic apparatus 100 in the present embodiment includes a display device 110, a carrier structure 120, and an electronic device 130. The electronic device 130 is tablet computer, for example, and has a first display surface 130a, and the display device 110 is a screen of a personal computer, for example, and has a second display surface 110a, wherein the dimension of the second display surface 110a is larger than the dimension of the first display surface 130a. The carrier structure 120 is electrically connected to the electronic device 110, the electronic device 130 is carried on the carrier structure 120 and electrically connected to the display device 110 through the carrier structure 120, so that the first display surface 130a of the electronic device 130 and the second display surface 110a of the display device 110 may simultaneously display an image of the operating system of the electronic device 130.

Figure 2A:
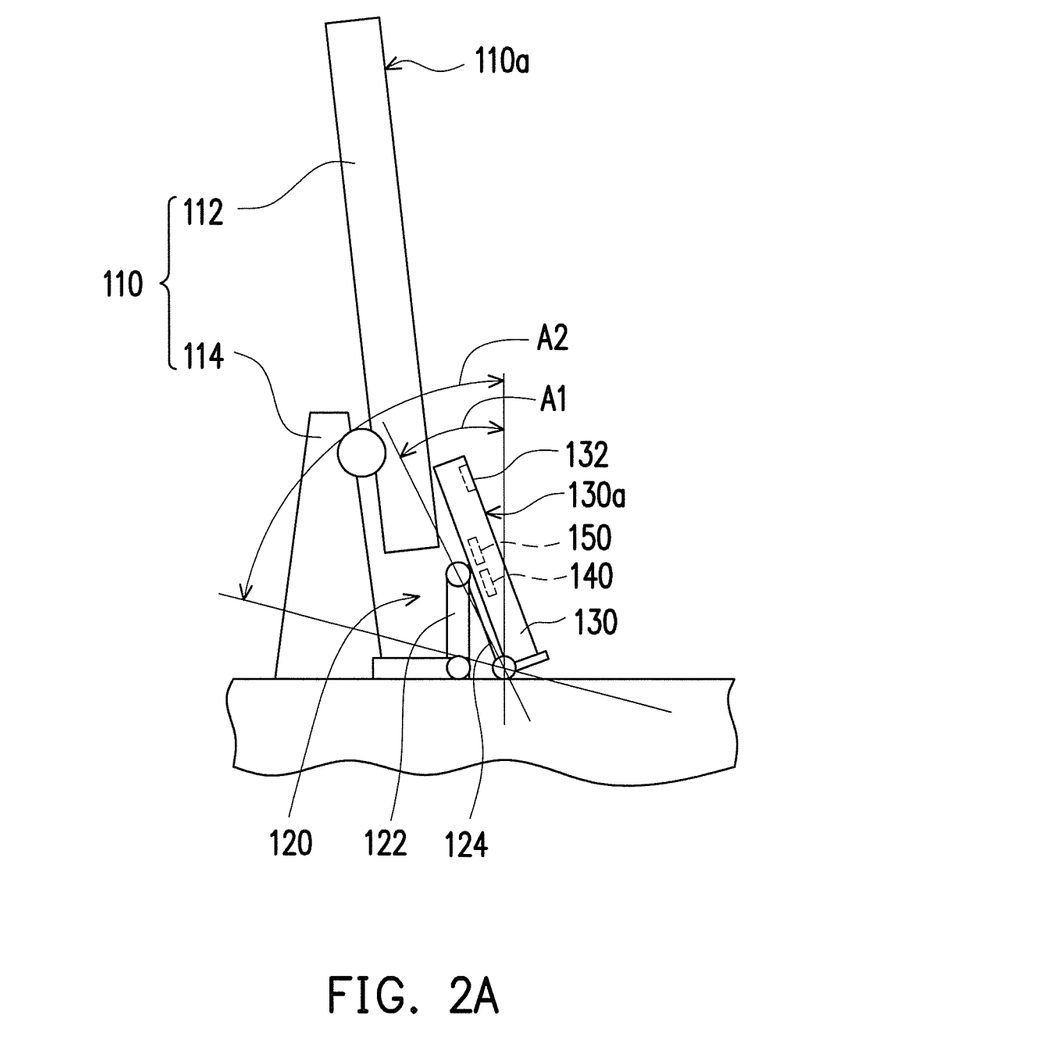
FIG. 2A and FIG. 2B are schematic views showing that the tilting angle of the electronic device of FIG. 1 changes.
Figure 2B:
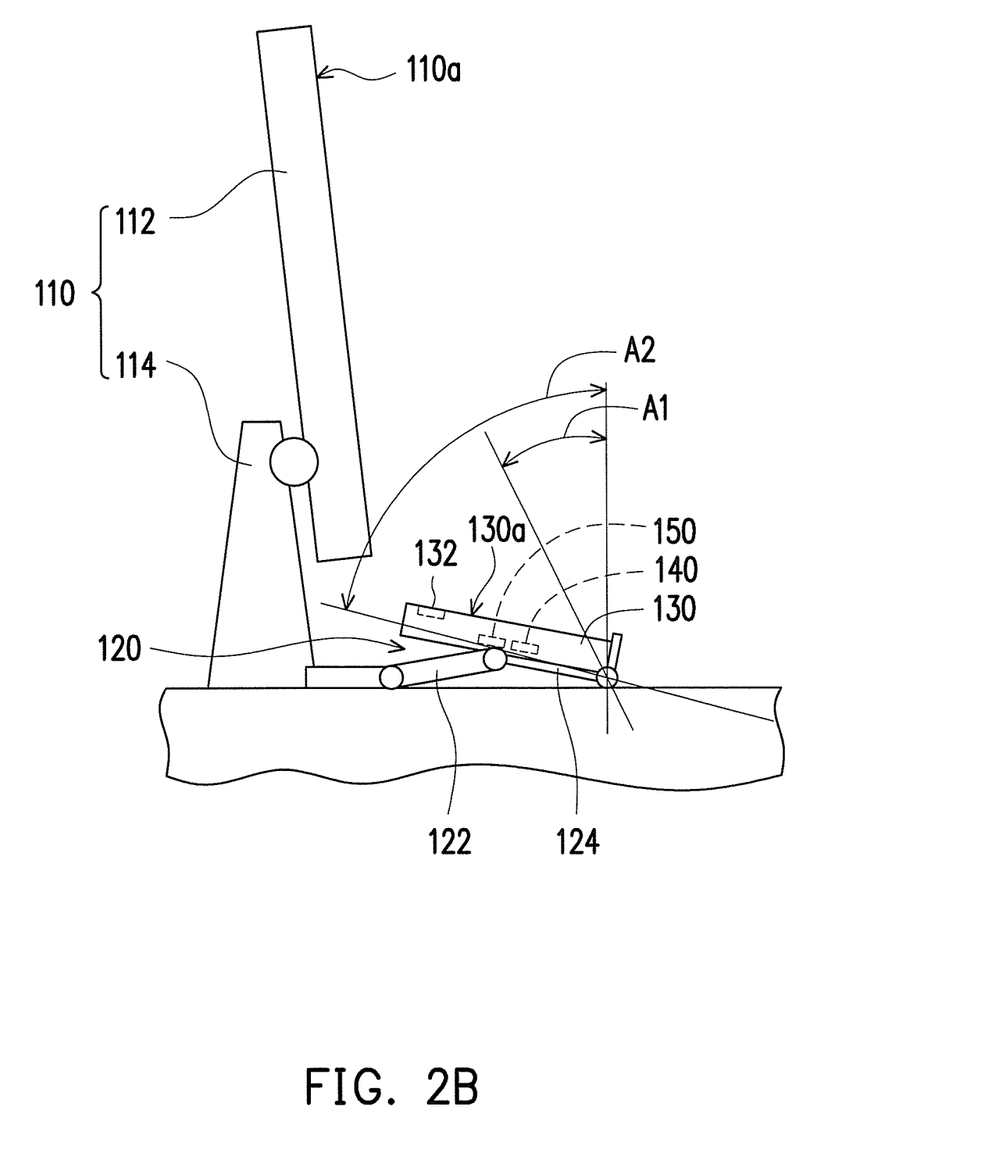

FIG. 2A and FIG. 2B are schematic views showing that the tilting angle of the electronic device of FIG. 1 changes. The tilting angle of the electronic device 130 may change with the actuation of the carrier structure 120 as shown in FIG. 2A and FIG. 2B. The electronic apparatus 100 further includes a sensing unit 140 and a control unit 150. The sensing unit 140 is a gravity sensor (G-sensor) or other dynamic sensing unit and disposed at the electronic device 130, for example. The control unit 150 is a control circuit and disposed in the electronic device 130 and electrically connected to the sensing unit 140, for example. In a broad sense, in addition to the control circuit of hardware, the control unit 150 also includes a firmware program, an operating system, a driving program and other related application software programs. The positions of the sensing unit 140 and the control unit 150 shown in FIG. 1, FIG. 2A and FIG. 2B are merely for schematic illustration, they may be disposed at any other suitable positions in the electronic device 130, and the disclosure is not limited thereto.

Figure 3:
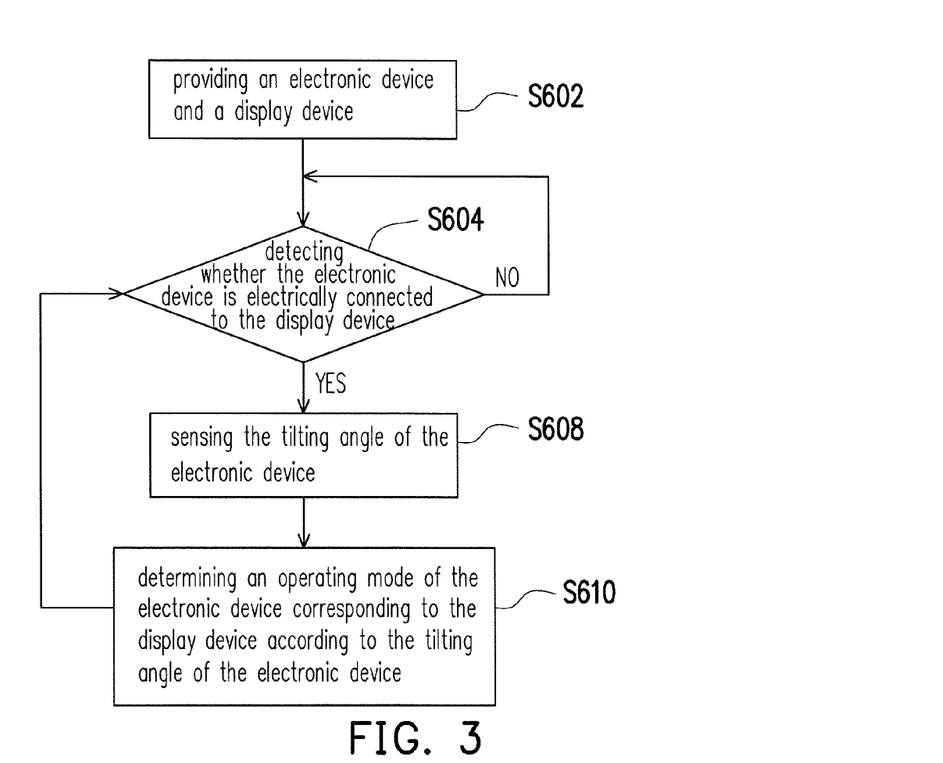
FIG. 3 is a flowchart illustrating the electronic device using method depicted in FIG. 1.

The using method of the electronic device 130 according to the present embodiment is elaborated hereinafter. FIG. 3 is a flowchart illustrating the electronic device using method depicted in FIG. 1. Referring to FIG. 3, first of all, the electronic device 130 and the display device 110 shown in FIG. 1 are provided (step S602). Next, whether the electronic device 130 is electrically connected to the display device 110 is detected (step S604). If the electronic device 130 is not electrically connected to the display device 110, then the detecting step S604 is continuously performed and the operating mode of the electronic device 130 is not changed according to the tilting angle of the electronic device 130. If the electronic device 130 is not electrically connected to the display device 110, then the tilting angle of the electronic device 130 is sensed by the sensing unit 140 (step S608), and then, the control unit determines the operating mode of the electronic device 130 corresponding to the display device 110 according to the tilting angle of the electronic device 130 (step S610). As such after the electronic device 130 is electrically connected to the display device 110, the operating mode is automatically determined according to the tilting angle of the electronic device 130.

As mentioned above, the carrier structure 120 of the present embodiment is electrically connected to the display device 110, and the electronic device 130 is adapted to be electrically connected to the display device 110 through the carrier structure 120. Accordingly, in the step S604, a specific method of detecting whether the electronic device 130 is electrically connected to the display device 110 may be detecting whether the electronic device 130 is electrically connected to the carrier structure 120, for example. More specifically, the electronic device 130 may include a connection detecting unit which is used for detecting whether the electronic device 130 is electrically connected to the display device 110.

After the step S610 in which the operating mode of the electronic device 130 corresponding to the display device 110 is determined, if the user has adjusted the tilting angle of the electronic device 130, then the process is back to the step S604 in which whether the electronic device 130 is electrically connected to the display device 110. If the electronic device 130 is electrically connected to the display device 110, then as illustrated in the step S608, the adjusted tilting angle of the electronic device 130 is sensed by the sensing unit 140, and then as illustrated in the step S610, the operating mode of the electronic device 130 corresponding to the display device 110 is determined according to the adjusted tilting angle of the electronic device 130. As such after the tilting angle of the electronic device 130 is adjusted, the operating mode is automatically switched according to the adjusted tilting angle.

Figure 4:
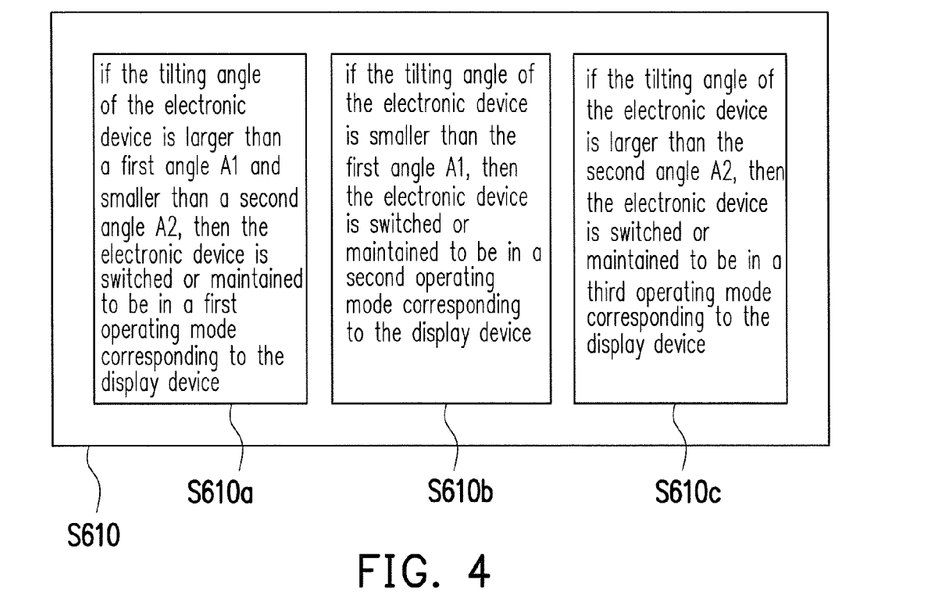
FIG. 4 is the sub-steps of the step S610 shown in FIG. 3.

The specific embodiment of the abovementioned step S610 is elaborated hereinafter. FIG. 4 is the sub-steps of the step S610 shown in FIG. 3. After the step S608 in which the tilting angle of the electronic device 130 is sensed by the sensing unit 140 as shown in FIG. 3, the following sub-steps are performed according to the step S610 of FIG. 4. If the tilting angle of the electronic device 130 is larger than the first angle A1 and smaller than the second angle A2 as shown in FIG. 1, then the electronic device 130 is switched or maintained to be in a first operating mode corresponding to the display device 110 (step S610a). If the tilting angle of the electronic device 130 is smaller than the first angle A1 as shown in FIG. 2A, then the electronic device 130 is switched or maintained to be in a second operating mode corresponding to the display device 110 (step S610b). If the tilting angle of the electronic device 130 is larger than the second angle A2 as shown in FIG. 2B, then the electronic device 130 is switched or maintained to be in a third operating mode corresponding to the display device 110 (step S610c).

More specifically, the step S610 in which the operating mode of the electronic device 130 corresponding to the display device 110 is determined according to the tilting angle of the electronic device 130 is that, the control unit 150 determines a relationship between the image displayed by the first display surface 130a of the electronic device 130 and the image displayed by the second display surface 110a of the display device 110 according to the tilting angle of the electronic device 130, namely, the display statuses of the first display surface 130a and the second display surface 110a are different according to the switch of the first operating mode, the second mode, or the third operating mode, for example, as illustrated below.

Figure 5A:
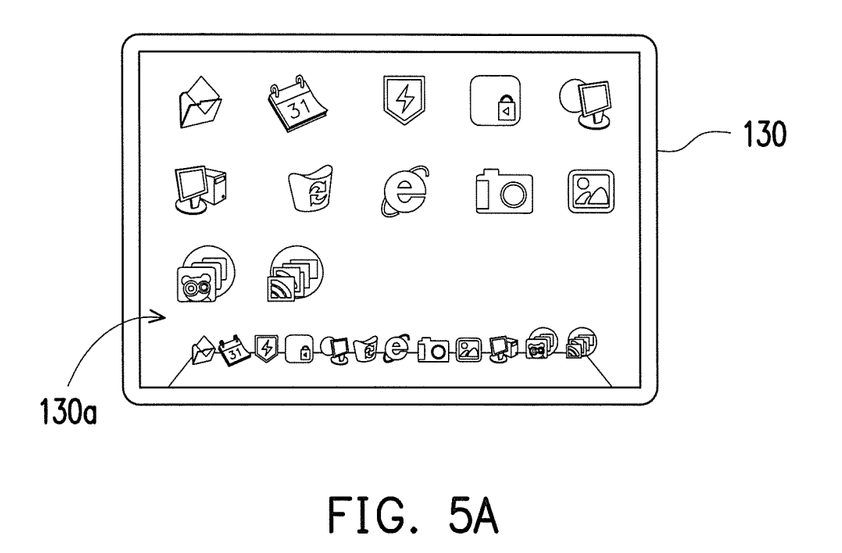
FIG. 5A is a schematic view illustrating an image displayed by the first display surface of the electronic device shown in FIG. 1.
Figure 5B:
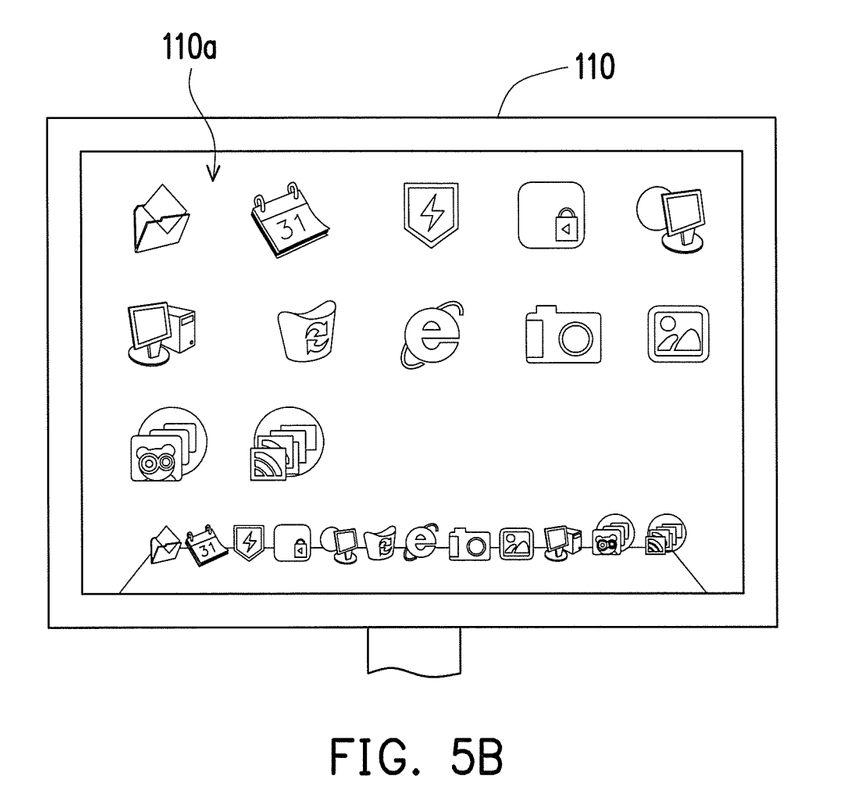
FIG. 5B is a schematic view illustrating an image displayed by the second display surface of the display device shown in FIG. 1.

FIG. 5A is a schematic view illustrating an image displayed by the first display surface of the electronic device shown in FIG. 1. FIG. 5B is a schematic view illustrating an image displayed by the second display surface of the display device shown in FIG. 1. The first operating mode is a common operating mode of the electronic device 130, for example. Under this operating mode, according to the tilting angle of the electronic 130 being larger than the first angle A1 and smaller than the second angle A2, the control unit 150 controls the first display surface 130a of the electronic 130 to display an operating interface as shown in FIG. 5A and the second display surface 110a of the display device 110 to display a mirror image of the operating interface as shown in FIG. 5B, so that the user may use the larger second display surface 110a of the display device 110 for viewing and operating image under the common operating mode. In addition, under the common operating mode, the first display surface 130a of the electronic device 130 may be controlled to display the common operating interface as abovementioned while the second display surface 110a of the display device 110 may be controlled to display an extending image of the operating interface, so as to increase the extending range of the operating interface, however the disclosure is not limited thereto.

Figure 6A:
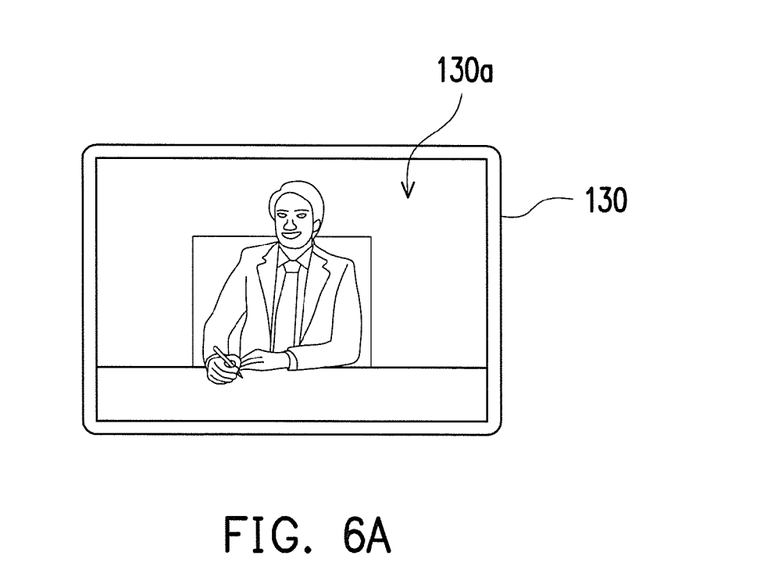
FIG. 6A is a schematic view illustrating an image displayed by the first display surface of the electronic device shown in FIG. 2A.
Figure 6B:
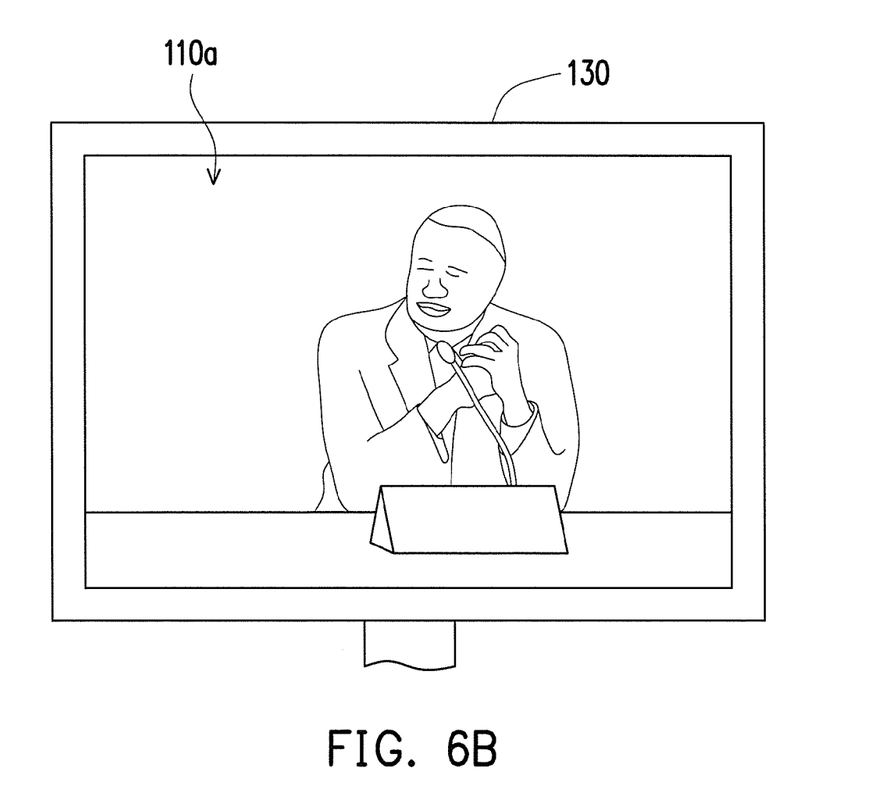
FIG. 6B is a schematic view illustrating an image displayed by the second display surface of the display device shown in FIG. 2A.

FIG. 6A is a schematic view illustrating an image displayed by the first display surface of the electronic device shown in FIG. 2A. FIG. 6B is a schematic view illustrating an image displayed by the second display surface of the display device shown in FIG. 2A. The electronic device 130 has a first image capturing unit 132, and the first display surface 130a and the first image capturing unit 132 are located at the same side of the electronic device 130. The abovementioned second operating mode is a video conference mode of the electronic device 130, for example. Under this operating mode, the control unit 150 controls the first display surface 130a of the electronic device 130 to display the image captured by the first image capturing unit 132 (the self image of user is shown) as shown in FIG. 6A according to the tilting angle of the electronic device 130 which is smaller than the first angle A1, and the image captured by the first image capturing unit 132 is transmitted to a remote device, and the second display surface 110a of the display device 110 to display the image captured by the remote device (the self image of another user from remote is shown) as shown in FIG. 6B, so that the user may use the first display surface 130a of the electronic device 130 for viewing the user's self image under the video conference mode, and use the larger second display surface 110a of the display device 110 for viewing the self image of another user from remote, and the another user from remote may also view the image captured by the first image capturing unit 132.

Figure 7A:
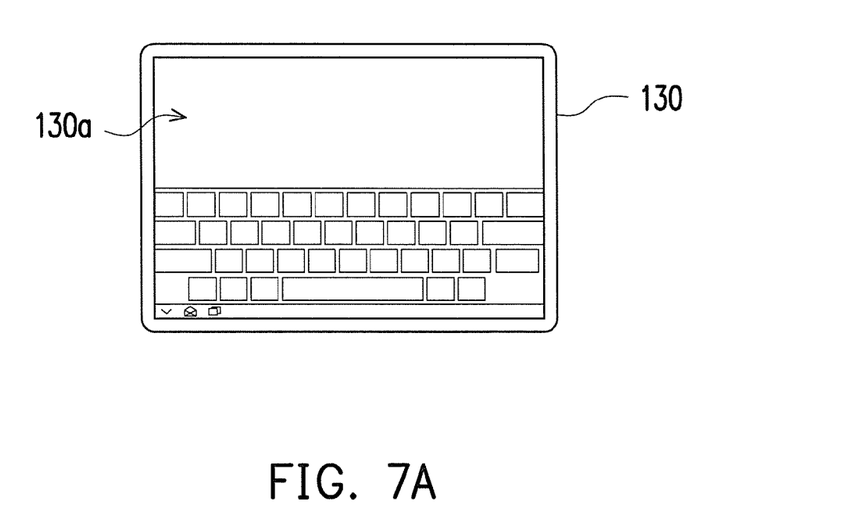
FIG. 7A is a schematic view illustrating an image displayed by the first display surface of the electronic device shown in FIG. 2B.
Figure 7B:
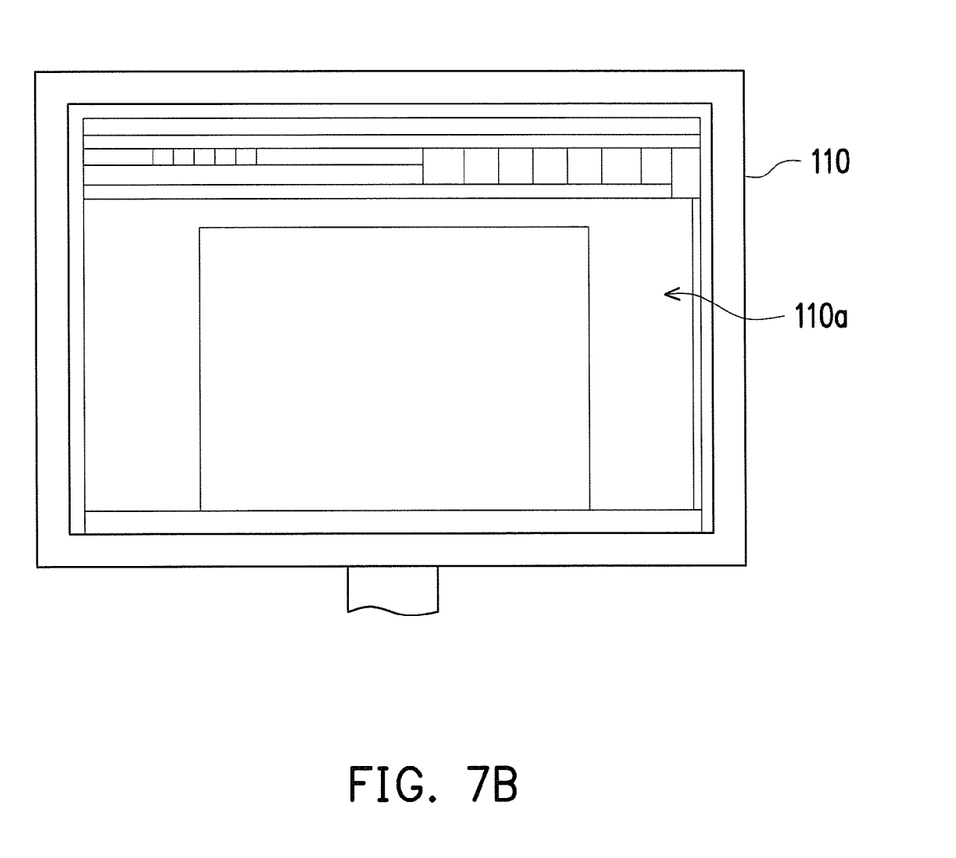
FIG. 7B is a schematic view illustrating an image displayed by the second display surface of the display device shown in FIG. 2B.

FIG. 7A is a schematic view illustrating an image displayed by the first display surface of the electronic device shown in FIG. 2B. FIG. 7B is a schematic view illustrating an image displayed by the second display surface of the display device shown in FIG. 2B. The abovementioned third operating mode is a touch input mode of the electronic device 130, for example. Under this operating mode, according to the tilting angle of the electronic 130 being larger than the second angle A2, the control unit 150 controls the first display surface 130a of the electronic 130 to display a touch input interface (shown as a virtual keyboard) as shown in FIG. 7A and the second display surface 110a of the display device 110 to display an output image corresponding to the touch input interface (shown as word editing image) as shown in FIG. 7B, so that the user may use the first display surface 130a of the electronic device 130 for performing touch input, and use the larger second display surface 110a of the display device 110 for viewing the output image under the touch input mode.

As mentioned above, the user may merely need to adjust the electronic device 130 to be in a suitable tilting angle as shown in FIG. 1, so that the electronic device 130 may be automatically switched to be in the common operating mode corresponding to the display device 110 which is adapted for performing with the tilting angle. Additionally, the user may merely need to adjust the electronic device 130 to be in the smaller tilting angle as shown in FIG. 2A, so that the electronic device 130 and the display device 110 may be automatically switched to be in the video conference mode which is adapted for performing with the tilting angle, and the user may merely need to adjust the electronic device 130 to be in the larger tilting angle as shown in FIG. 2B, so that the electronic device 130 and the display device 110 may be automatically switched to be in the touch input mode which is adapted for performing with the tilting angle. Accordingly, the operating process of the electronic device 130 and the display device 110 may be simplified, and the user may be provided a smoother and more intuitional operating experience.

The disclosure does not limit the values of the first angle A1 and the second angle A2, and the first angle A1 and the second angle A2 may be set according to actual requirement. Moreover, in the present embodiment, the electronic device 130 corresponding to the display device 110 has three operating modes (i.e., the abovementioned first operating mode, the second operating mode, and the third operating mode), however the disclosure is not limited thereto, and in other embodiments, the electronic device 130 corresponding to the display device 110 may be designed to have two kinds, four kinds or other suitable kinds with any quantity of operating modes, and the electronic device 130 may be respectively switched to be in various operating modes corresponding to different methods as mentioned above according to different tilting angles.

Figure 8:
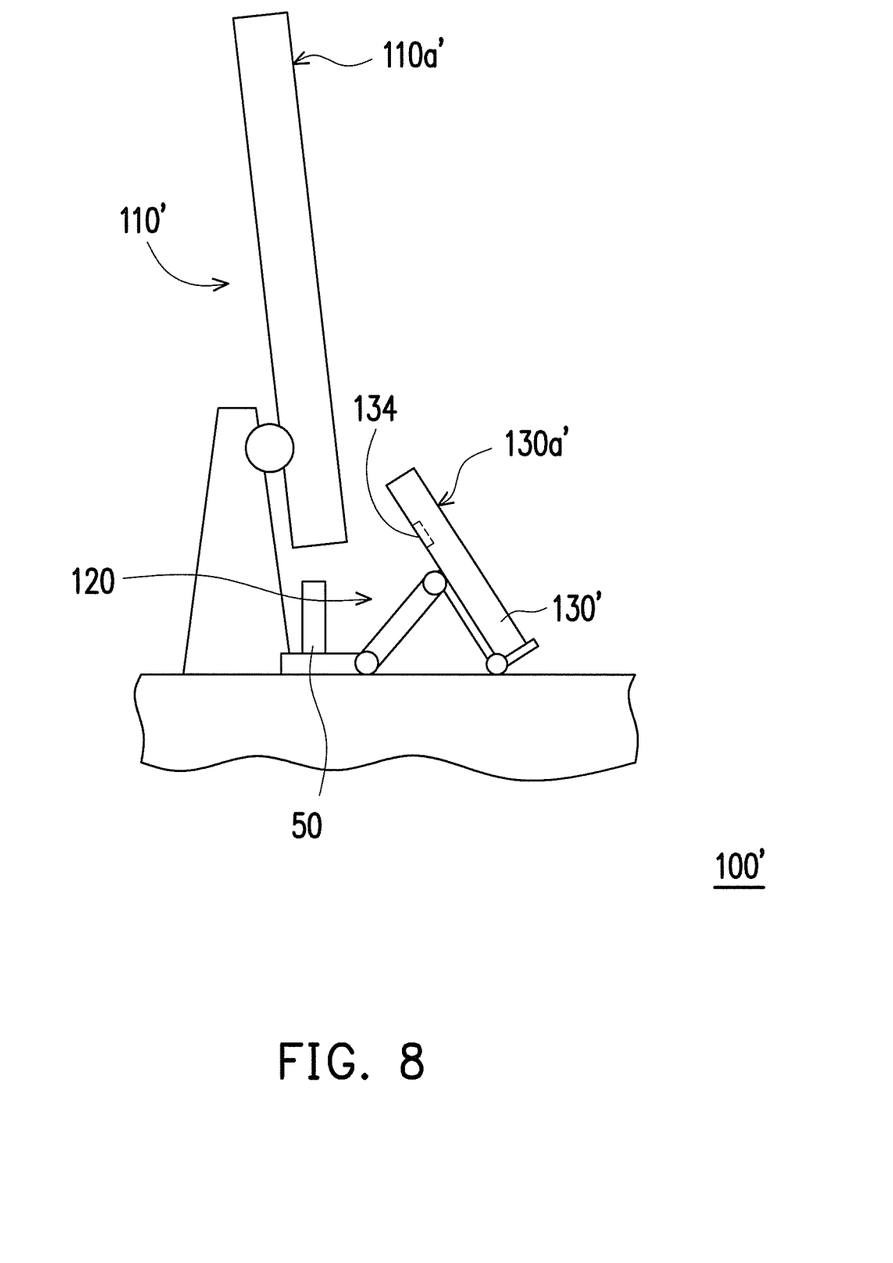
FIG. 8 is a schematic view of an electronic apparatus according to another exemplary embodiment of the disclosure.

In addition to the common operating mode, the video conference mode, and the touch input mode, the electronic device 130 corresponding to the display device 110 may also be switched to be in other types of operating modes according to the tilting angle of the electronic device 130. FIG. 8 is a schematic view of an electronic apparatus according to another exemplary embodiment of the disclosure. For instance, in the electronic apparatus 100' shown in FIG. 8, the electronic device 130' has a second image capturing unit 134, and the first display surface 130a' and the second image capturing unit 134 are located at the opposite sides of the electronic device 130' respectively. When the electronic device 130' has a specific tilting angle or is in a specific tilting angle range with the actuation of the carrier structure 120' as shown in FIG. 8, the electronic device 130' and the display device 110' are switched to be in a camera mode, for example. Under this operating mode, the first display surface 130a' of the electronic device 130' is controlled to display the image of the object 50 captured by the second image capturing unit 134 as shown in FIG. 8A according to the tilting angle of the electronic device 130, and the image of the object 50 captured by the second image capturing unit 134 is transmitted to a remote device, and the second display surface 110a' of the display device 110' is controlled to display the image captured by the remote device, so that the user may use the first display surface 130a' of the electronic device 130' for viewing the image of the object 50 under the camera mode, and use the larger second display surface 110a' of the display device 110' for viewing the image of another user from remote, and the another user from remote may also view the image of the object 50 captured by the second image capturing unit 134.

In other embodiments, in the operating process, a confirm option may further be displayed by the electronic device 130, so that the user may select whether the electronic device 130 and the display device 110 automatically switch the operating modes according to the tilting angle of the electronic device 130. In following, it will be further described with reference to FIG. 9, FIG. 10 and FIG. 11.

Figure 9:
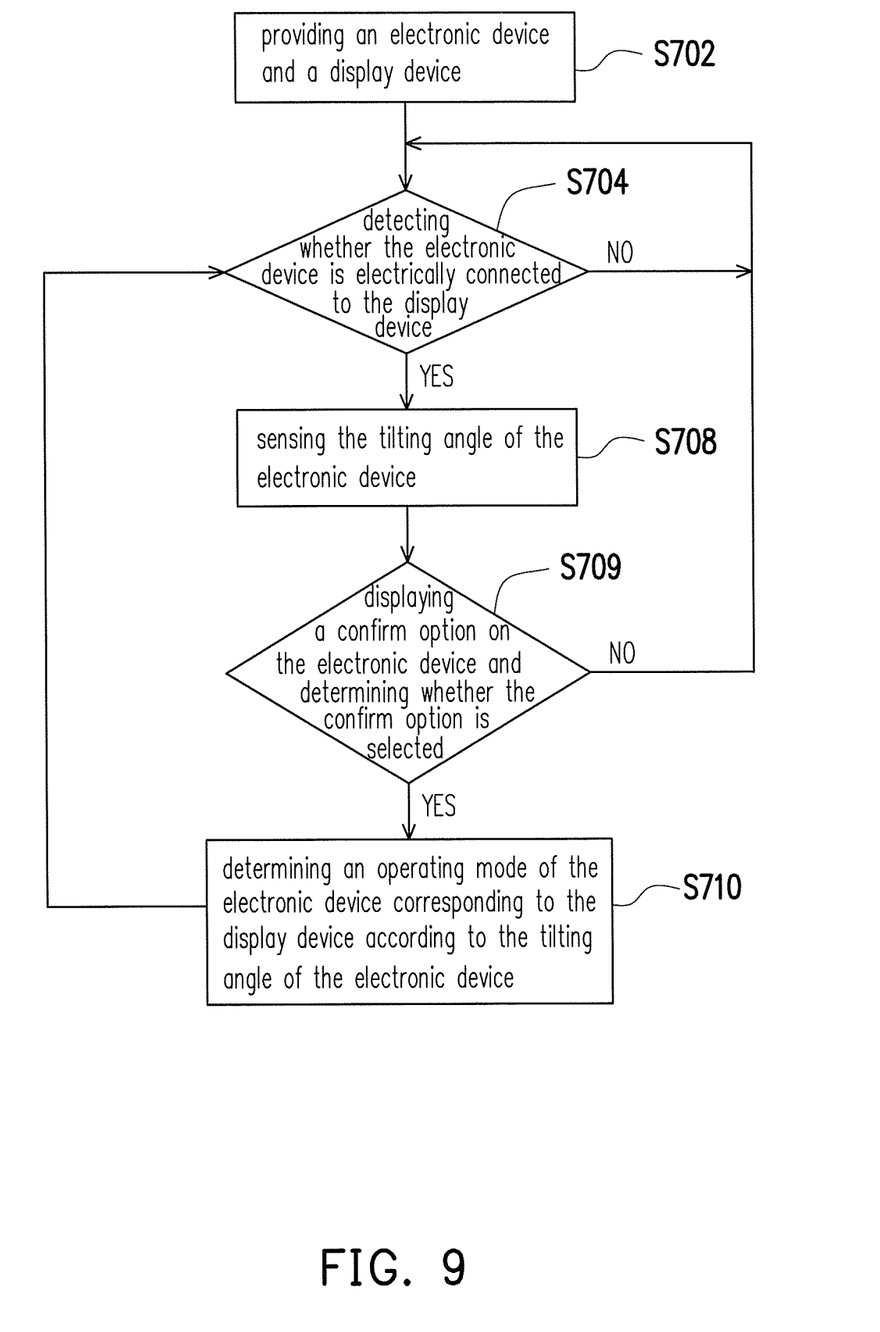
FIG. 9 is a flowchart illustrating an electronic device using method according to another exemplary embodiment of the disclosure.

FIG. 9 is a flowchart illustrating an electronic device using method according to another exemplary embodiment of the disclosure. The steps S702, S704, and S708 shown in FIG. 9 are the same as the steps S602, S604, and S608 shown in FIG. 3, and it is not repeated herein. The difference between the embodiment shown in FIG. 9 and the embodiment shown in FIG. 3 is described as follows. After the step S708 in which the tilting angle of the electronic device 130 is sensed, when the tilting angle is in the predetermined first angle A1, second angle A2 or other specific angle as mentioned above and the operating mode of the electronic device 130 is to be determined, the electronic device 130 may first display a confirm option and determine whether the option is selected or not (step S709). If the confirm option is selected, then the control unit 150 determines the operating mode of the electronic device 130 corresponding to the display device 110 according to the tilting angle of the electronic device 130 (step S710). If the confirm option is not selected, then the detecting process of the step S704 is continuously performed and the operating mode of the electronic device 130 corresponding to the display device 110 is not determined according to the tilting angle of the electronic device 130. As such after the electronic device 130 is electrically connected to the display device 110, the user may select by oneself whether the operating mode of the electronic device 130 corresponding to the display device 110 is to be automatically determined according to the tilting angle of the electronic device 130. The embodiment of the step S710 is the same as the sub-steps S610a through S610c shown in FIG. 4, for example.

As in the embodiment shown in FIG. 9, after the step S710 (the operating mode of the electronic device 130 corresponding to the display device 110 is determined according to the tilting angle of the electronic device 130), if the user has adjusted the tilting angle of the electronic device 130, then the process is back to the step S704, that is detecting whether the electronic device 130 is electrically connected to the display device 110, and the following steps are performed. The following steps have been described in the above, and thus the details thereof are omitted here. As such after the user has adjusted the tilting angle of the electronic device 130, the user may select by oneself whether the operating mode of the electronic device 130 corresponding to the display device 110 is to be automatically determined according to the tilting angle of the electronic device 130.

Figure 10:
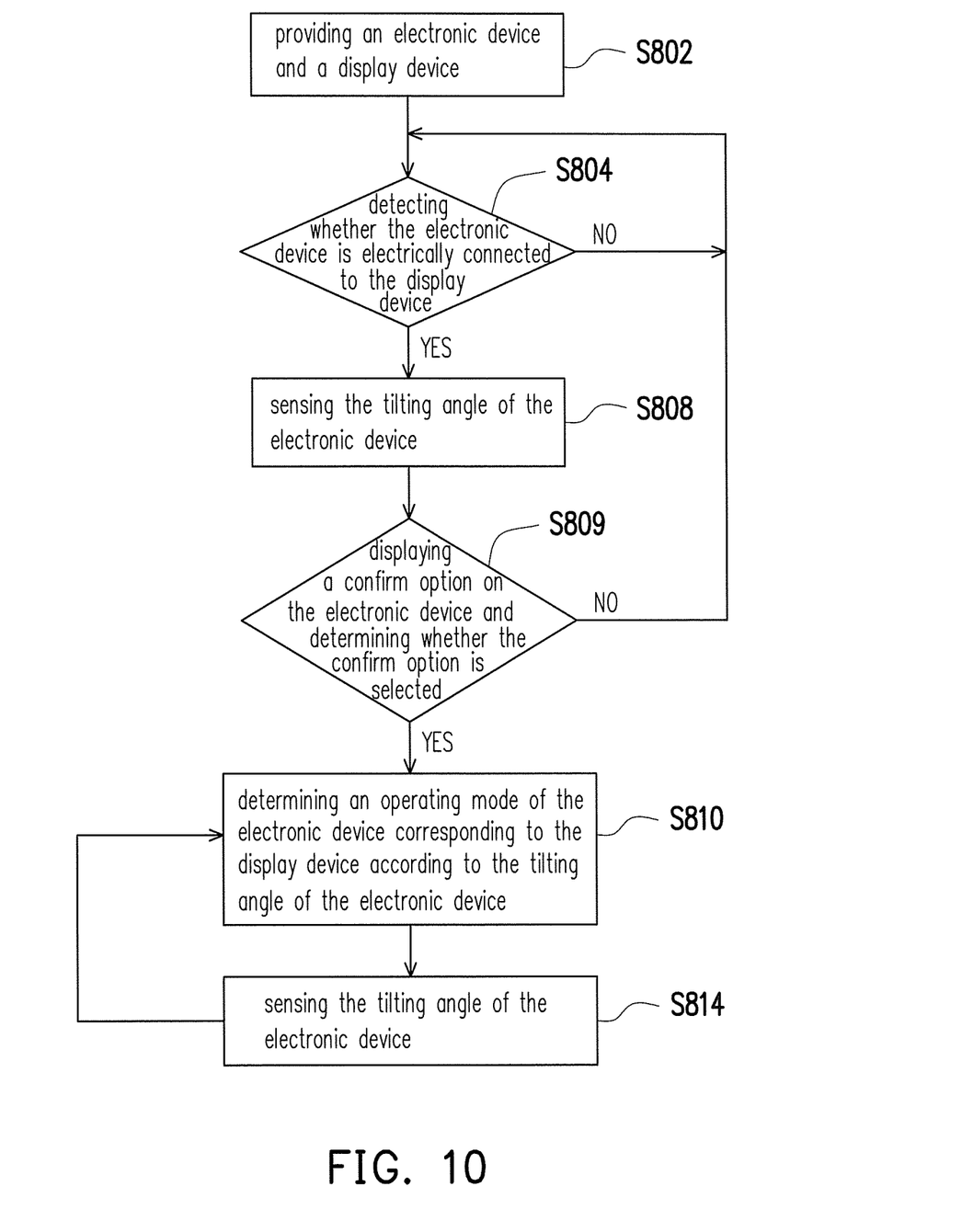
FIG. 10 is a flowchart illustrating an electronic device using method according to another exemplary embodiment of the disclosure.

FIG. 10 is a flowchart illustrating an electronic device using method according to another exemplary embodiment of the disclosure. The steps S802, S804, and S808 shown in FIG. 10 are the same as the steps S602, S604, and S608 shown in FIG. 3, and it is not repeated herein. The difference between the embodiment shown in FIG. 10 and the embodiment shown in FIG. 3 is described as follows. Referring to FIG. 10, after the step S808 in which the tilting angle of the electronic device 130 is sensed, when the tilting angle is in the predetermined first angle A1, second angle A2 or other specific angle as mentioned above and the operating mode of the electronic device 130 is to be determined, the electronic device 130 may display a confirm option and determine whether the option is selected or not (step S809). If the confirm option is selected, then the operating mode of the electronic device 130 corresponding to the display device 110 is determined according to the tilting angle of the electronic device 130 (step S810). If the confirm option is not selected, then the detecting process of the step S804 is continuously performed and the operating mode of the electronic device 130 corresponding to the display device 110 is not determined according to the tilting angle of the electronic device 130. As such after the electronic device 130 is electrically connected to the display device 110, the user may select by oneself whether the operating mode of the electronic device 130 corresponding to the display device 110 is to be automatically determined according to the tilting angle of the electronic device 130. The embodiment of the step S810 is the same as the sub-steps S610a through S610c shown in FIG. 4, for example.

As in the embodiment shown in FIG. 10, after the step S810 (the operating mode of the electronic device 130 corresponding to the display device 110 is determined according to the tilting angle of the electronic device 130), if the user has adjusted the tilting angle of the electronic device 130, then the adjusted tilting angle of the electronic device 130 is sensed with the sensing device 140 (step S814), and then, as in the step S810, the operating mode of the electronic device 130 corresponding to the display device 110 is determined according to the tilting angle of the electronic device 130. As such after the tilting angle of the electronic device 130 is adjusted in the first time and the user confirms that the function of the automatically switching the operating mode is acceptable, then it is possible to automatically switch the operating mode according to the adjusted tilting angle and no need to be back to the steps S808 and S809 to inquire the user each time for confirming if the user accepts the function of automatically switching the operating mode.

Figure 11:
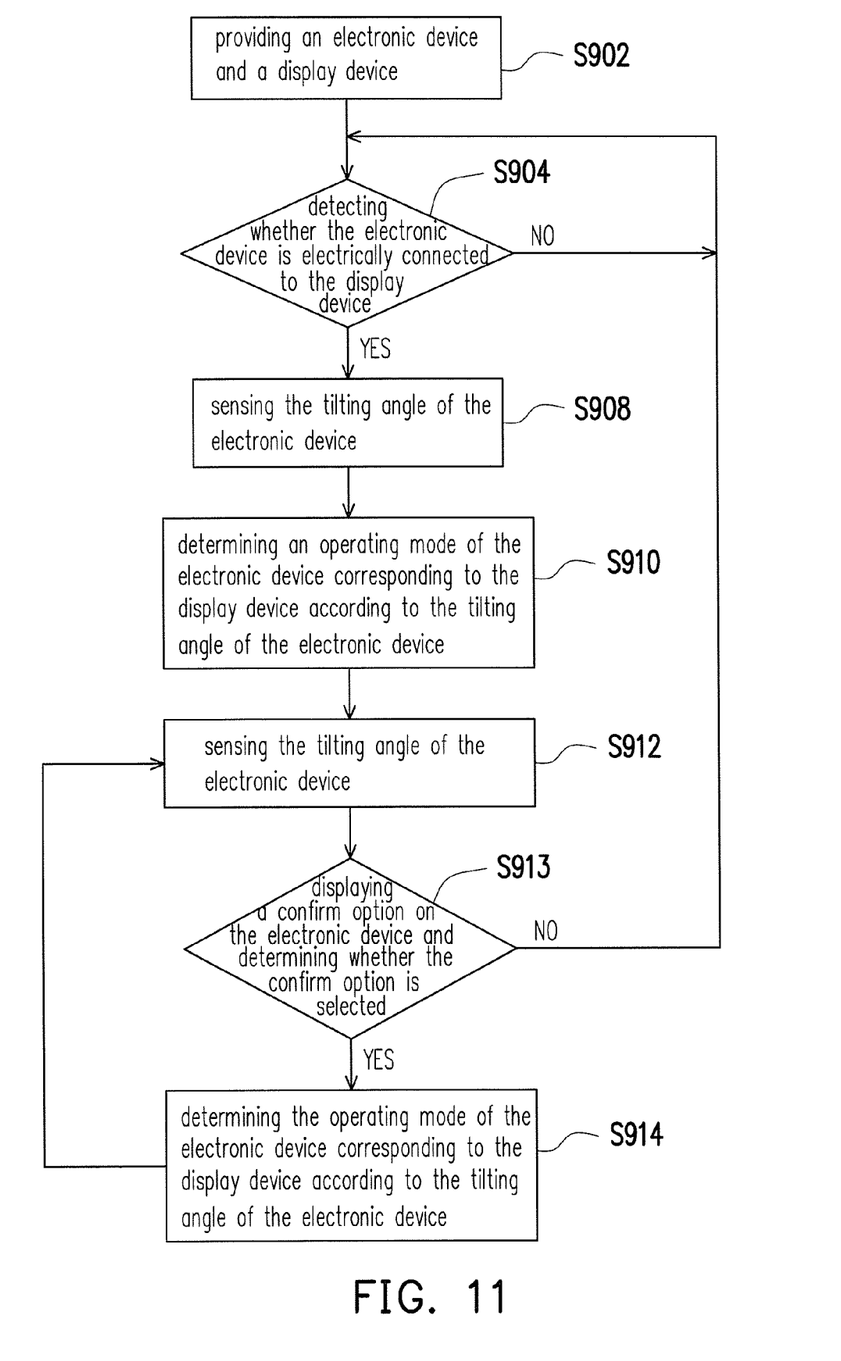
FIG. 11 is a flowchart illustrating an electronic device using method according to another exemplary embodiment of the disclosure.

FIG. 11 is a flowchart illustrating an electronic device using method according to another exemplary embodiment of the disclosure. The steps S902, S904, S908, and S910 shown in FIG. 11 are the same as the steps S602, S604, S608, and S610 shown in FIG. 3, and it is not repeated herein. The difference between the embodiment shown in FIG. 11 and the embodiment shown in FIG. 3 is described as follows. After the step S910 in which the operating mode of the electronic device 130 corresponding to the display device 110 is determined, if the user has adjusted the tilting angle of the electronic device 130, then the adjusted tilting angle of the electronic device 130 is sensed (step S912), when the tilting angle is in the predetermined first angle A1, second angle A2 or other specific angle as mentioned above and the operating mode of the electronic device 130 is to be determined, the electronic device 130 may display a confirm option and determine whether the option is selected or not (step S913). If the confirm option is selected, then the operating mode of the electronic device 130 corresponding to the display device 110 is determined according to the adjusted tilting angle of the electronic device 130 (step S914). If the confirm option is not selected, then the detecting process of the step S904 is continuously performed and the operating mode of the electronic device 130 corresponding to the display device 110 is not determined according to the tilting angle of the electronic device 130. As such after the user has adjusted the tilting angle of the electronic device 130 in the first time and the corresponding operating mode is determined to actuate, at each time when the tilting angle of the electronic device 130 is adjusted, the user is inquired that if the operating mode the electronic device 130 is automatically switched according to the adjusted tilting angle of the electronic device 130 through selecting by the oneself. The embodiment of the steps S910 and S914 is the same as the sub-steps S610a through S610c of the step S610 shown in FIG. 4, for example.

The following describes the electronic apparatus and the carrier structure and the connection and actuation method thereof of the disclosure with reference to the embodiment of FIG. 1. Referring to FIG. 1, FIG. 2A and FIG. 2B, the display device 110 of the embodiment includes a display 112 and a stand 114. The carrier structure 120 includes a first component 122 and a second component 124 which are pivoted to each other. The stand 114 supports the display 112, the first component 122 of the carrier structure 120 is connected to the stand 114, the electronic device 130 is adapted to be carried on the second component 124, and the tilting angle of the electronic device 130 changes with the relative rotation between the first component 122 and the second component 124.

Figure 12:
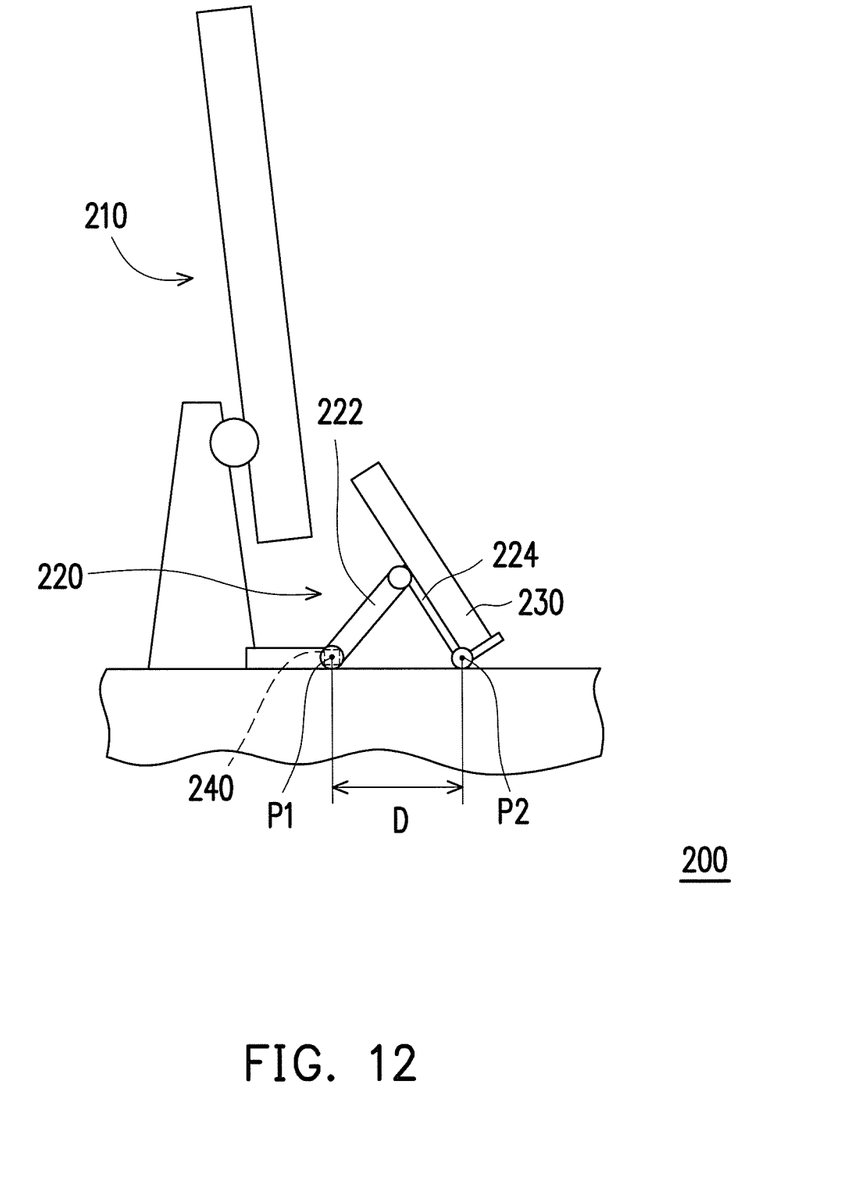
FIG. 12 is a schematic view of an electronic apparatus according to another exemplary embodiment of the disclosure.

FIG. 12 is a schematic view of an electronic apparatus according to another exemplary embodiment of the disclosure. In the electronic apparatus 200 of FIG. 12, the configuration and using method of the display device 210, the carrier surface 220 and the electronic device 230 are similar to the configuration and using method of the display device 110, the carrier structure 120 and the electronic device 130, thus it is not repeated herein. The difference between the electronic apparatus 200 and the electronic apparatus 100 is that, the sensing unit 240 is not the same as the sensing unit 140 of FIG. 1 which is disposed at the electronic device 130, and is not the same as the sensing unit 140 of FIG. 1 which is a dynamic sensing unit. The sensing unit 240 is disposed at the carrier structure 220 and is a laser distance measurement device, an infrared distance measurement device, an ultrasonic distance measurement device, or any other distance sensing unit, and used for sensing the tilting angle of the electronic device 230, and the using method is described specifically below.

The distance D between the first position P1 on the first component 222 and the second position P2 of the second component 224 changes with the relative rotation of the first component 222 and the second component 224, namely, the tilting angle of the electronic device 230 carried on the second component 224 may be different with the variation of the distance D between the first position P1 and the second position P2. In the present embodiment, the larger the distance D then the larger the tilting angle of the electronic device 230, and the smaller the distance D then the smaller the tilting angle of the electronic device 230. The sensing unit 240 is disposed at the first position P1 or the second position P2 (shown as disposed at the first position P1) and used for sensing the distance D between the first position P1 and the second position P2. The tilting angle of the electronic device 230 may be obtained according to the length of the first component 222, the length of the second component 224 and the distance D, and via mathematical calculations such as trigonometry or the like, and it is omitted herein.

In other embodiments, the sensing unit 240 may also employ a variable resistor sensor which is disposed at the place where the first component 122 and the stand 114 are pivoted or other sensor which can detect the relative rotation angle, and is used for sensing the tilting angle of the electronic device 230.

In light of the foregoing, in the electronic device using method of the disclosure, when the electronic device is electrically connected to the display device so that the electronic device and the display device may simultaneously perform displaying images, the operating mode of the electronic device corresponding to the display device is switched according to the tilting angle of the electronic device. Accordingly, users may only need to adjust the electronic device to have a tilting angle which is corresponding to a specific operating mode, then the electronic device may be automatically switched to be in the specific operating mode corresponding to the display device as expected by the user, so as to simplifying the operating process of the electronic device and the display device, such that the user may be provided a smoother and more intuitional operating experience. Furthermore, in the operating process, a confirm option may further be displayed by the electronic device, so that the user may select by oneself whether the operating mode of the electronic device corresponding to the display device is automatically switched according to the tilting angle of the electronic device, and the flexibility of the use of electronic device is further enhanced.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. An electronic device operating method, the electronic device selectively electrically connected to a display device, the method comprising:
   detecting whether the electronic device is electrically connected to the display device;
   if the electronic device is electrically connected to the display device, then sensing a tilting angle of the electronic device; and
   determining an operating mode of the electronic device corresponding to the display device according to the tilting angle of the electronic device,
   wherein the electronic device has a first display surface, the display device has a second display surface, the step of determining the operating mode of the electronic device corresponding to the display device comprises:
   determining a relationship between an image displayed by the first display surface and an image displayed by the second display surface according to the tilting angle of the electronic device.

2. The electronic device operating method as claimed in claim 1, wherein the step of detecting whether the electronic device is electrically connected to the display device comprises:
   providing a carrier structure, wherein the carrier structure is electrically connected to the display device and adapted to carry the electronic device; and
   detecting whether the electronic device is electrically connected to the carrier structure.

3. The electronic device operating method as claimed in claim 1, wherein the step of sensing the tilting angle of the electronic device comprises:
   providing a sensing unit, wherein the sensing unit is disposed at the electronic device; and
   sensing the tilting angle of the electronic device by the sensing unit.

4. The electronic device operating method as claimed in claim 1, wherein the step of sensing the tilting angle of the electronic device comprises:
   providing a carrier structure and a sensing unit, wherein the carrier structure carries the electronic device, the sensing unit is disposed at the carrier structure; and
   sensing the tilting angle of the electronic device by the sensing unit.

5. The electronic device operating method as claimed in claim 4, wherein the carrier structure comprises a first component and a second component, the first component and the second component are adapted to actuate relatively to change the tilting angle of the electronic device, the step of sensing the tilting angle of the electronic device comprises:
sensing a distance between the first component and the second component by the sensing unit; and
obtaining the tilting angle of the electronic device according to the distance between the first component and the second component.

6. The electronic device operating method as claimed in claim 1, wherein the step of determining the relationship between the image displayed by the first display surface and the image displayed by the second display surface comprises:
the first display surface displaying an operating interface and the second display surface displaying a mirror image or an extending image of the operating interface, according to the tilting angle of the electronic device.

7. The electronic device operating method as claimed in claim 1, wherein the step of determining the relationship between the image displayed by the first display surface and the image displayed by the second display surface comprises:
the first display surface displaying a touch input interface and the second display surface displaying an output image corresponding to the touch input interface, according to the tilting angle of the electronic device.

8. The electronic device operating method as claimed in claim 1, wherein the electronic device has a first image capturing unit, the first display surface and the first image capturing unit are located at a same side of the electronic device, the step of determining the relationship between the image displayed by the first display surface and the image displayed by the second display surface comprises:
the first display surface displaying an image captured by the first image capturing unit and the second display surface displaying a remote image captured by a remote device, according to the tilting angle of the electronic device.

9. The electronic device operating method as claimed in claim 1, wherein the electronic device has a second image capturing unit, the first display surface and the second image capturing unit are located at two opposite sides of the electronic device respectively, the step of determining the relationship between the image displayed by the first display surface and the image displayed by the second display surface comprises:
the first display surface displaying an image captured by the second image capturing unit and the second display surface displaying a remote image captured by a remote device, according to the tilting angle of the electronic device.

10. The electronic device operating method as claimed in claim 1, wherein the step of determining the operating mode of the electronic device corresponding to the display device comprises:
if the tilting angle of the electronic device is larger than a first angle and smaller than a second angle, then switching or maintaining the electronic device to be in a first operating mode corresponding to the display device;
if the tilting angle of the electronic device is smaller than the first angle, then switching or maintaining the electronic device to be in a second operating mode corresponding to the display device; and
if the tilting angle of the electronic device is larger than the second angle, then switching or maintaining the electronic device to be in a third operating mode corresponding to the display device.

11. The electronic device operating method as claimed in claim 1, further comprising:
after the tilting angle of the electronic device is sensed, displaying a confirm option on the electronic device and determining whether the confirm option is selected;
if the confirm option is selected, then determining the operating mode of the electronic device and the display device according to the tilting angle of the electronic device; and
if the confirm option is not selected, then not determining the operating mode of the electronic device and the display device according to the tilting angle of the electronic device.

* * * * *